(12) United States Patent
Hayashi (10) Patent No.: US 11,125,608 B2
(45) Date of Patent: Sep. 21, 2021

(54) FREQUENCY IDENTIFYING DEVICE

(71) Applicant: OKUMA Corporation, Aichi (JP)

(72) Inventor: Yasukazu Hayashi, Aichi (JP)

(73) Assignee: OKUMA CORPORATION, Aichi (JP)

( * ) Notice: Subject to any disclaimer, the term of this patent is extended or adjusted under 35 U.S.C. 154(b) by 0 days.

(21) Appl. No.: 16/903,892

(22) Filed: Jun. 17, 2020

(65) Prior Publication Data

US 2020/0319021 A1 Oct. 8, 2020

Related U.S. Application Data

(63) Continuation of application No. 15/353,263, filed on Nov. 16, 2016.

(30) Foreign Application Priority Data

Nov. 25, 2015 (JP) ................................ 2015-229495

(51) Int. Cl.
 *G01H 13/00* (2006.01)
 *H02P 29/00* (2016.01)

(52) U.S. Cl.
 CPC ............. *G01H 13/00* (2013.01); *H02P 29/00* (2013.01)

(58) Field of Classification Search
 CPC ......... H02P 29/045; H02P 7/00; G01H 13/00; G05B 2219/41166; G05B 2219/41232; G11B 5/59688
 See application file for complete search history.

(56) References Cited

U.S. PATENT DOCUMENTS

| | | | |
|---|---|---|---|
| 5,475,291 A | 12/1995 | Yoshida et al. | |
| 6,274,994 B2 | 8/2001 | Tsutsui | |
| 6,590,358 B1 | 7/2003 | Tsutsui | |
| 6,744,233 B1 | 6/2004 | Tsutsui | |
| 7,068,923 B2 | 6/2006 | Miyazaki | |
| 7,449,857 B2 | 11/2008 | Ohta et al. | |
| 7,638,965 B2 | 12/2009 | Miyazaki | |

(Continued)

FOREIGN PATENT DOCUMENTS

| | | |
|---|---|---|
| DE | 102014006525 A1 | 11/2014 |
| EP | 2012206 A2 | 1/2009 |

OTHER PUBLICATIONS

U.S. Final Office Action for U.S. Appl. No. 15/353,263 dated Feb. 12, 2019.

(Continued)

*Primary Examiner* — Matthew G Marini
(74) *Attorney, Agent, or Firm* — Cantor Colburn LLP (57) ABSTRACT

A window function calculator applies a Hann window function to Vd (n) to obtain a numeric value Vw (n). For twenty successive numeric values Vw(n) for every twenty numeric values (N=20), each of the Fourier calculators to executes Fourier calculation. Further, the SRSS calculators to calculate square root of sum of squares of SIM and COS components of respective orders of the results of Fourier calculation as numeric values A2, A3, A4, A5. A subtractor calculates a numeric value Ci=A3−A5, while a subtractor calculates a numeric value Si=A4−A2. A Frequency calculator calculates a numeric value Fi=(m+1+2*A TAN 2 (Ci, Si)/π)/(NT), which indicates the frequency identified. An amplitude calculator doubles the square root of the sum of squares of the numeric values Ci and Si, and calculates a numeric value Ai that indicates the amplitude of the frequency identified.

8 Claims, 9 Drawing Sheets

(56) References Cited

U.S. PATENT DOCUMENTS

| | | |
|---|---|---|
| 2009/0009128 A1 | 1/2009 | Okita et al. |
| 2010/0128386 A1 | 5/2010 | Keizer et al. |
| 2013/0063064 A1 | 3/2013 | Fujiwara et al. |
| 2013/0103224 A1 | 4/2013 | Egami et al. |
| 2014/0333249 A1 | 11/2014 | Sonoda |

OTHER PUBLICATIONS

U.S. Final Office Action for U.S. Appl. No. 15/353,263 dated Apr. 26, 2019.
U.S. Non-Final Office Action for U.S. Appl. No. 15/353,263 dated Dec. 9, 2019.
U.S. Non-Final Office Action for U.S. Appl. No. 15/353,263 dated Sep. 9, 2019.
German Office Action for corresponding DE Application No. 102016122005.1; dated Apr. 22, 2021.

FREQUENCY IDENTIFYING DEVICE

CROSS REFERENCE TO RELATED APPLICATION

The present application is a continuation of U.S. patent application Ser. No. 15/353,263, filed Nov. 16, 2016, the entire contents of which are incorporated herein by reference and priority to which is hereby claimed. Application Ser. No. 15/353,263 claimed the benefit of the date of the earlier filed Japanese Patent Application No. 2015-229495 filed on Nov. 25, 2015 priority to which is also claimed herein, and the contents of which are also incorporated herein by reference in its entirety.

TECHNICAL FIELD

The present invention relates to a frequency identifying device incorporated mainly in a servo control device etc. for identifying a cyclically changing frequency of a signal in a high band contained in a signal used in control processing.

BACKGROUND

In driving a table of a machine tool, using a ball screw etc. connected to a servo motor, a servo control device executes position control processing and speed control processing, based on a position instruction supplied from a numerical control device and a position detection amount supplied from an encoder mounted on the servo motor, to thereby determine a three-phase current to be supplied to the servo motor to control a motor current. With the above, it is possible to move the table to a position in accordance with the position instruction. In such control of a table, etc., as response characteristic on the machine side is limited, it is possible to ensure sufficient responsiveness necessary for the machine as long as it is possible to faithfully control a frequency up to a few tens of Hz. However, to faithfully control a frequency up to a few tens of Hz, it is not possible to achieve faithful control within a frequency band necessary for machine control if responsiveness in speed control is not ensured up to a frequency of about ten times the response frequency. Accordingly, in order to implement a highly accurate and very responsive machine, servo control characteristic in which responsiveness is ensured in such a high band that is actually not necessary in machine control is necessary. However, with an arrangement for enabling control of a servo motor up to a high band, a servo motor responds to a cyclical error, such as mechanical resonance of a ball screw etc. in a high band, interpolation error of an encoder, or the like. This causes a problem of generation of mechanical resonance and abnormal noise. To address the above, as to mechanical resonance, a notch filter etc. having less effect on the phase characteristic in a low band is used to remove a resonance frequency component from a torque instruction value etc. Also, as to an encoder, an encoder with the smallest possible interpolation error is mounted on a servo motor.

In manufacturing of a highly accurate and very responsive machine, a high pre-load is applied to a bearing and a ball screw used so that lost motion of the machine is thereby reduced. However, in the long term, such a pre-load drops due to abrasion etc., which causes change in machine characteristic. As a result, mechanical resonance frequency is deviated, which results in drop in effect of the notch filter. This causes a problem of re-generation of mechanical resonance and abnormal noise. Also, with the pre-load dropped, lost motion due to minute displacement between the motor and the table increases, as a result of which a structural component positioned farther from the server motor becomes less responsive to a driving force at a high frequency that causes vibration that causes minute displacement. As a result, a frequency with higher inertia of a shaft driven by a servo motor equivalently decreases, and the loop gain for speed control becomes higher in a higher band. This results in a servo motor that is more likely to respond to a higher frequency than it did at the time of shipment. Therefore, a problem arises in that mechanical resonance and abnormal noise is newly generated at a higher frequency at which such a problem was absent at the time of shipment.

Also, depending on the mechanical structure, there are cases where the mechanical resonance frequency changes slightly depending on the position of a table or the weight of a workpiece mounted thereon, etc. Therefore, in a machine under such a condition, there is a problem in that a removal frequency band is narrow, a notch filter having preferable phase characteristic cannot be used, and therefore it is not possible to increase responsiveness in servo control.

Further, regarding an interpolation error of an encoder, as the frequency of an error component will change depending on a motor rotation speed, even though the amount of position error is not critical in view of processing accuracy, a vibration level becomes higher at a rate proportional to the square of a frequency in a higher band. Moreover, a person will perceive sound at a larger volume in a higher band due to the characteristics of the human auditory system. Therefore, in a more responsive machine, an interpolation error of an encoder may more likely turn out to be noise, and it is thus necessary to employ a super-accurate encoder that is over-spec in view of processing accuracy.

Note that there is a method available for reducing adverse response in a high band by using a low-pass filter etc. However, increase of removal characteristic of a low-pass filter deteriorates phase characteristic in a low band, while the phase characteristic in a low band is necessary in machine control, and a condition under which such a situation can be coped with by using a low-pass filter is limited.

SUMMARY

An object according to one aspect of the present invention is to implement a frequency identifying device that identifies, in a short period of time, cyclically changing frequency, phase, and amplitude of an adverse signal in a high band, caused due to mechanical resonance and interpolation error of an encoder. An object according to another aspect is to remove an adverse signal component in a high band by utilizing this frequency identifying device, to prevent generation of resonance and abnormal noise.

A frequency identifying device according to the present invention is a frequency identifying device that samples an N number of input signals in a constant cycle T, and identifies, from data to which a window function has been multiplied, a frequency of a single signal between a frequency $(m+1)/(NT)$ and a frequency $(m+2)/(NT)$, with a resolution higher than $1/(NT)$, based on eight values, including COS components and SIN components of m-order (m being a natural number less than $N/2-4$), m+1 order, m+2 order, and m+3 order, namely, $C(m)$, $C(m+1)$, $C(m+2)$, $C(m+3)$, $S(m)$, $S(m+1)$, $S(m+2)$, and $S(m+3)$, obtained by applying Fourier conversion to the N number of data items, with an NT cycle as a first order (that is, a component of a frequency with the length of N×T as one cycle is assumed as a first-order component).

Also, when a function of a square root is denoted as SQRT, the frequency identifying device may calculate Si=SQRT(C(m+2)^2+S(m+2)^2)−SQRT(C(m)^2+S(m)^2) and Ci=SQRT(C(m+1)^2+S(m+1)^2)−SQRT(C(m+3)^2+S(m+3)^2), and identify a frequency Fi, based on the values of a numeric value Ci and a numeric value Si.

Also, when an arc tangent function of two variables is denoted as A TAN 2, the frequency identifying device may calculate Fi=(m+1+2*A TAN 2(Ci,Si)/π)/(NT) to thereby identify the frequency Fi. Note that A TAN 2 (X, Y) is a function for calculating the angle formed by a line connecting the coordinates origin and a point (X, Y) relative to the positive direction of the X axis.

Also, the frequency identifying device may identify the amplitude of a signal of the frequency Fi, based on the value of 2*SQRT (Ci^2+Si^2).

Also, the frequency identifying device may identify the phase of a signal of a frequency Fi, based on the frequency Fi and the value of A TAN 2(C(m+1), S(m+1)) or the value of A TAN 2(C(m+2), S(m+2)).

Other than the above, there may be provided a signal removal apparatus including the above described frequency identifying device and a digital notch filter for receiving inputs of the frequency identified by the identifying device and an input signal, for removing the component of the identified frequency from the input signal.

Also, there may be provided a signal removal apparatus including the above described frequency identifying device, a digital signal generator for generating a signal having a frequency, an amplitude, and a phase that are the same as those which are identified by the frequency identifying device, and a subtractor for subtracting the signal generated by the signal generator from the input signal.

In a frequency identifying device according to the present invention, it is possible to highly accurately identify the frequency, phase, and amplitude of a signal having a single frequency, that is present in a band that is the same as that of a first order frequency, based on eight parameters of four successive orders obtained in Fourier conversion (SIN components and COS components of these four orders). Therefore, it is possible to identify, in a short period of time, a frequency in a band higher than a second-order component, based on a significantly smaller number of data items than those in typical fast Fourier transform conversion (FFT). Also, it is possible to identify a frequency with respect to a signal of which frequency changes sharply in response to change in speed, such as interpolation error of an encoder, and also to remove, without using a filter, a signal component due to an interpolation error, using a digital signal generation device for receiving inputs of the frequency, phase, and amplitude identified. This makes it possible to use a low-cost encoder having interpolation accuracy in accordance with processing accuracy. Also, as it is possible to remove an adverse signal, without using a filter that affects phase characteristic on a low band side, it is possible to improve response characteristic of servo control. Also, as it is possible to significantly reduce a processing period of time in a frequency identifying device according to the present invention, compared to a sophisticated servo system for identifying the frequency of a notch filter, using an FFT etc., it is possible to reduce processing burden in servo control.

With the above, it is possible to implement, using a frequency identifying device according to the present invention, a highly responsive servo system which is unlikely to cause mechanical oscillation and abnormal noise, at lower cost.

BRIEF DESCRIPTION OF THE DRAWINGS

Embodiment(s) of the present disclosure will be described based on the following figures, wherein.

DESCRIPTION OF EMBODIMENTS

Figure 1:
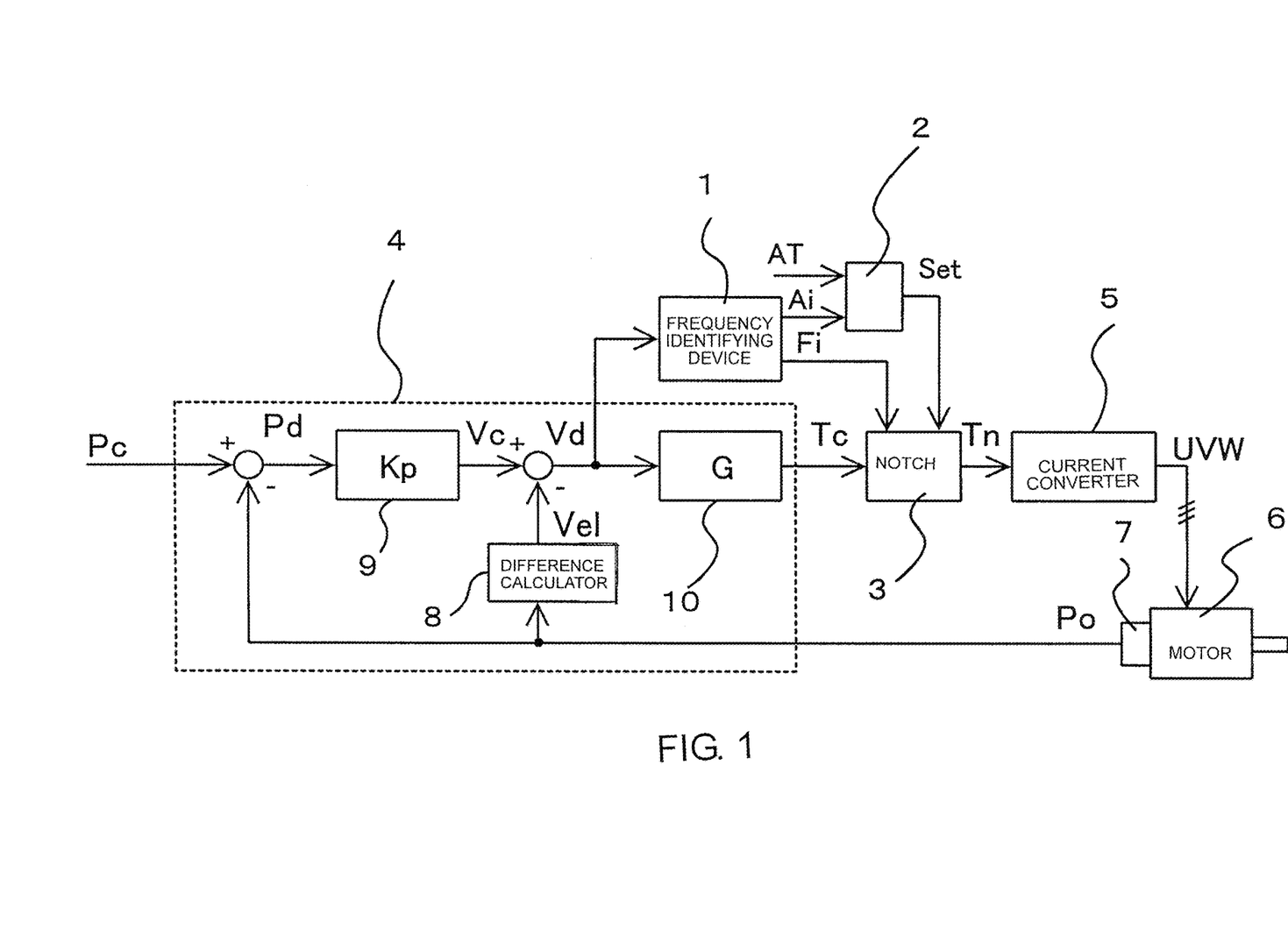
FIG. 1 is block diagram of a servo control system, showing one example of a signal removal apparatus including a frequency identifying device according to the present invention and a digital notch filter combined.

In the block 4 in FIG. 1 that shows servo control, position detection data Po detected by an encoder 7 mounted on a servo motor 6 is subtracted from a position instruction value Pc instructed by a numerical control device etc. to thereby calculate a position deviation Pd. In a multiplier 9, a position loop gain Kp is multiplied by the position deviation Pd to output a speed instruction value Vc. In a difference calculator 8, the difference between the position detection data Po and previous position detection data Po is calculated to thereby calculate a speed Vel, and outputted. The speed Vel is subtracted from the speed instruction value Vc to thereby calculate a speed deviation Vd. A transfer function calculator 10 multiplies a proportional gain and an integral gain to the speed deviation Vd. The transfer function calculator 10 also performs, on the result of gain multiplication, filter operation, using a filter, such as a notch filter or a low-pass filter, for removing a mechanical resonance frequency component with less frequency variation by such an amount that does not significantly affect a low band phase, to thereby calculate a torque instruction value Tc, and outputs the calculated value. In the example used in this explanation, calculation of the speed deviation Vd and the torque instruction value Tc is executed in a control cycle at an interval of T=500 µs, which is, however, merely an example.

Figure 2:
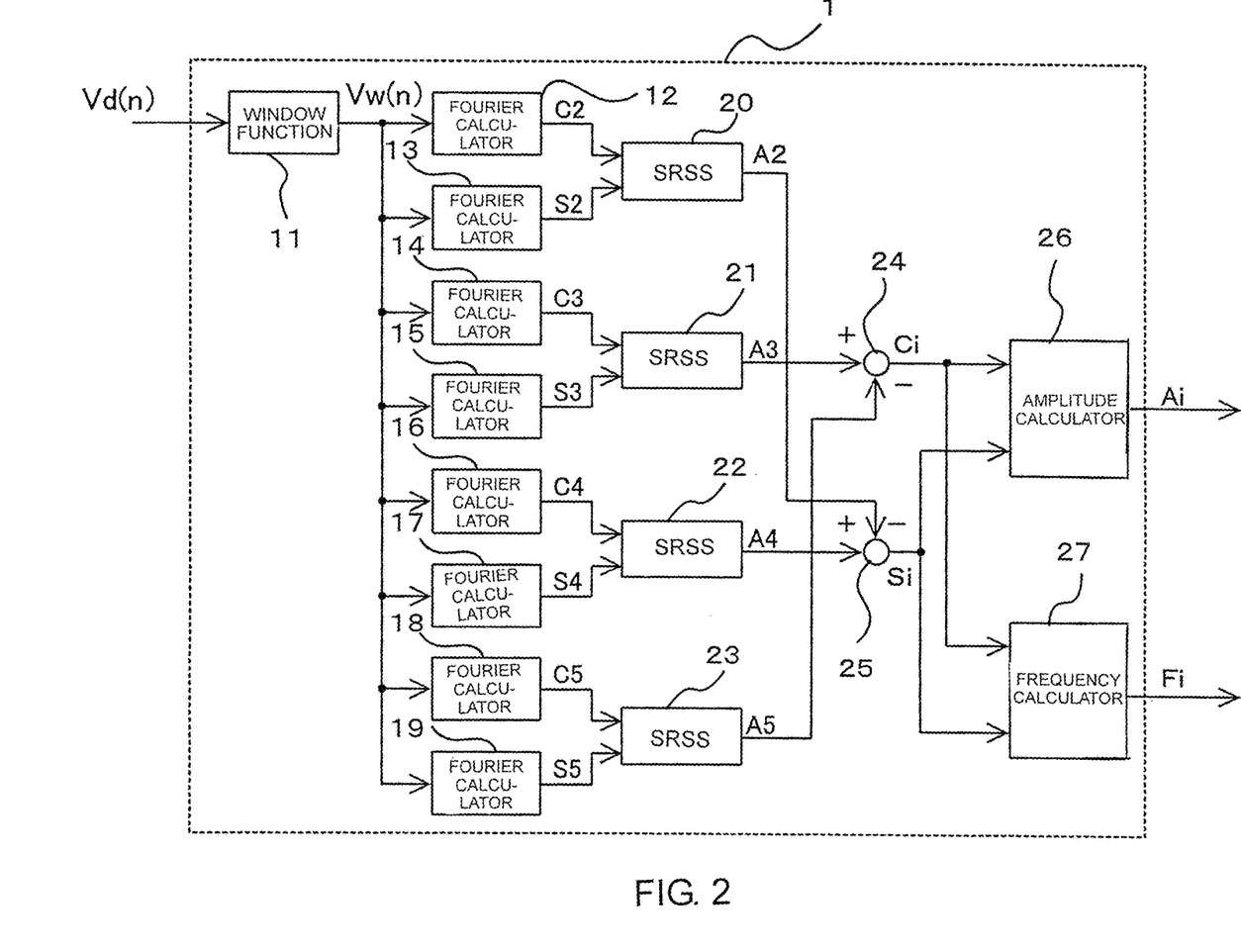
FIG. 2 is a block diagram showing an internal structure of the frequency identifying device shown in FIG. 1.

The speed deviation Vd is also inputted into a frequency identifying device 1. An example of the internal structure of the frequency identifying device 1 is shown in FIG. 2. The frequency identifying device 1 includes a window function calculator 11, and the window function calculator 11 executes a calculation of a Hann window function Vd(n)*(0.5−0.5*COS(2π*n/N)) for the speed deviation Vd(n) inputted, and outputs the result of calculation as a numeric value Vw(n). In this example, N=20 is set. In this case, for the numeric value Vw(n) after window function processing, Fourier calculators 12, 13, 14, 15, 16, 17, 18, 19 respectively multiply COS(2π*2n/N), SIN(2π*2n/N), COS(2π*3n/N), SIN(2π*3n/N), COS(2π*4n/N), SIN(2π*4n/N), COS ($2\pi*5n/N$), $SIN(2\pi*5n/N)$ by each of twenty respective successive numeric values Vw(n) for every twenty numeric values (N=20), then each add the twenty results of multiplication, and multiply the result of addition by 0.1. With the above, the Fourier calculators 12, 13, 14, 15, 16, 17, 18, 19 respectively output a second-order COS component (m=2), a second-order SIN component, a third-order COS component, a third-order SIN component, a fourth-order COS component, a fourth-order SIN component, a fifth-order COS component, and a fifth-order SIN component, namely, numeric values C2, S2, C3, S3, C4, S4, C5, S5, with the frequency 100 Hz (the value of 1/(NT) in this example) as a first-order basic wave.

The numeric values C2 and S2, the numeric values C3 and S3, the numeric values C4 and S4, and the numeric values C5 and S5 are inputted into respective SRSS (Square Root of Sum of Squares) calculators 20, 21, 22, 23. Each of the SRSS calculators 20, 21, 22, 23 calculates a square root of the sum of squares of the two numeric values inputted (that is, an amplitude at each order), and outputs the result of calculation as a numeric value A2, A3, A4, A5. The numeric values A3 and A5 are inputted into a subtractor 24. The subtractor 24 executes a calculation of A3−A5, and outputs the result of calculation as a numeric value Ci. Similarly, a subtractor 25 executes a calculation of A4−A2, and outputs the result of calculation as a numeric value Si. A frequency calculator 27 executes a calculation (3+2*A TAN 2(Ci,Si)/π)/(NT) for the numeric values Ci and Si, and outputs the result of calculation as a numeric value Fi. Meanwhile, an amplitude calculator 26 executes an SRSS calculation SQRT ($Ci^2+Si^2$) for the numeric values Ci and Si, then doubles the result of calculation, and outputs as a numeric value Ai.

Figure 3:
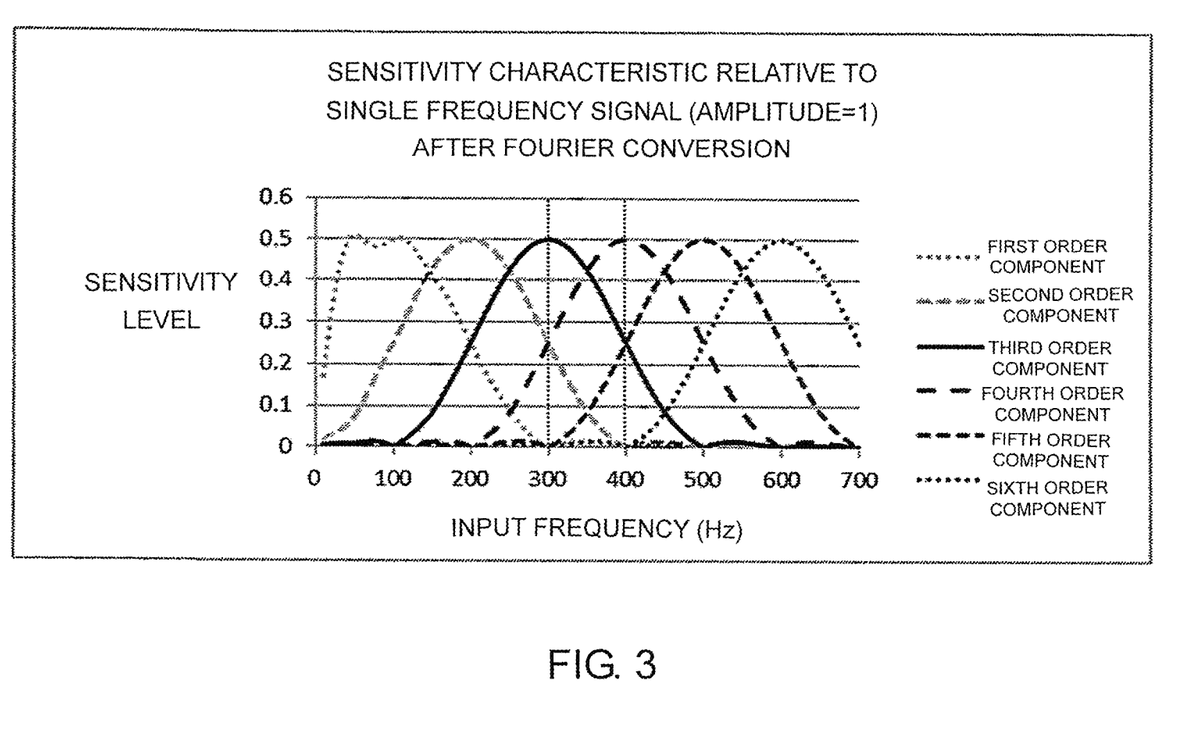
FIG. 3 is a graph showing characteristic of a signal in a circuit shown in the block diagram in FIG. 2.
Figure 4:
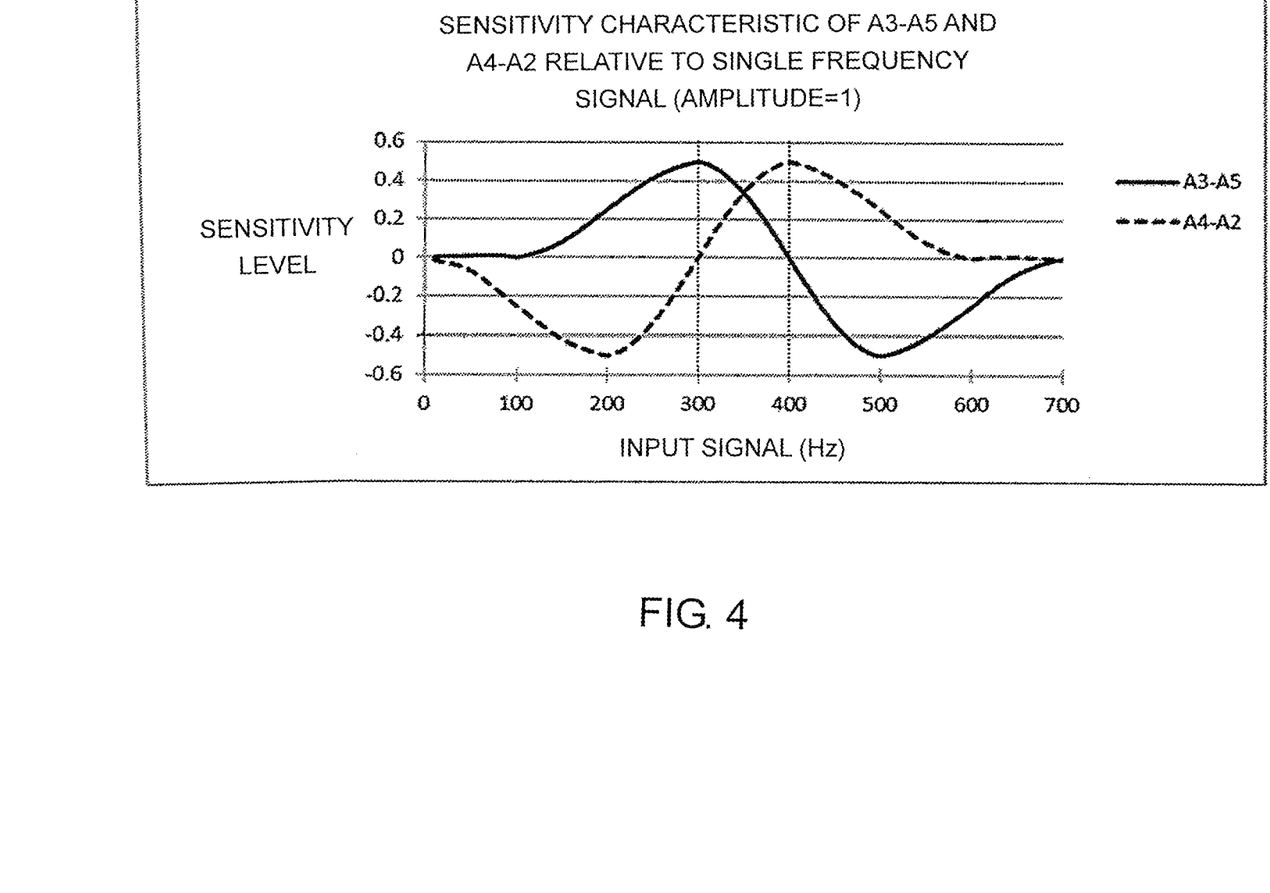
FIG. 4 is a graph showing another signal characteristic of the circuit shown in the block diagram in FIG. 2.

A graph showing sensitivity levels relative to input frequencies at respective numeric values A2, A3, A4, and A5 when an input signal Vd (n) has a single frequency is shown in FIG. 3. Also, a graph showing sensitivity characteristics of A3−A5 and of A4−A2 is shown in FIG. 4. As known from the graph in FIG. 4, between 300 Hz (3/(NT)) and 400 Hz (4/(NT)), a signal Ci of A3−A5 changes in proportion to a cosine value of a change in frequency of the input signal, and a signal Si of A4−A2 changes in proportion to a sine value of a change in frequency of the input signal. From the above, it can be understood that a numeric value Fi obtained in a calculation (m+1+2*A TAN 2(Ci, Si)/π)/(NT) with m=2 constitutes a value identified as the frequency of the input signal.

Figure 5:
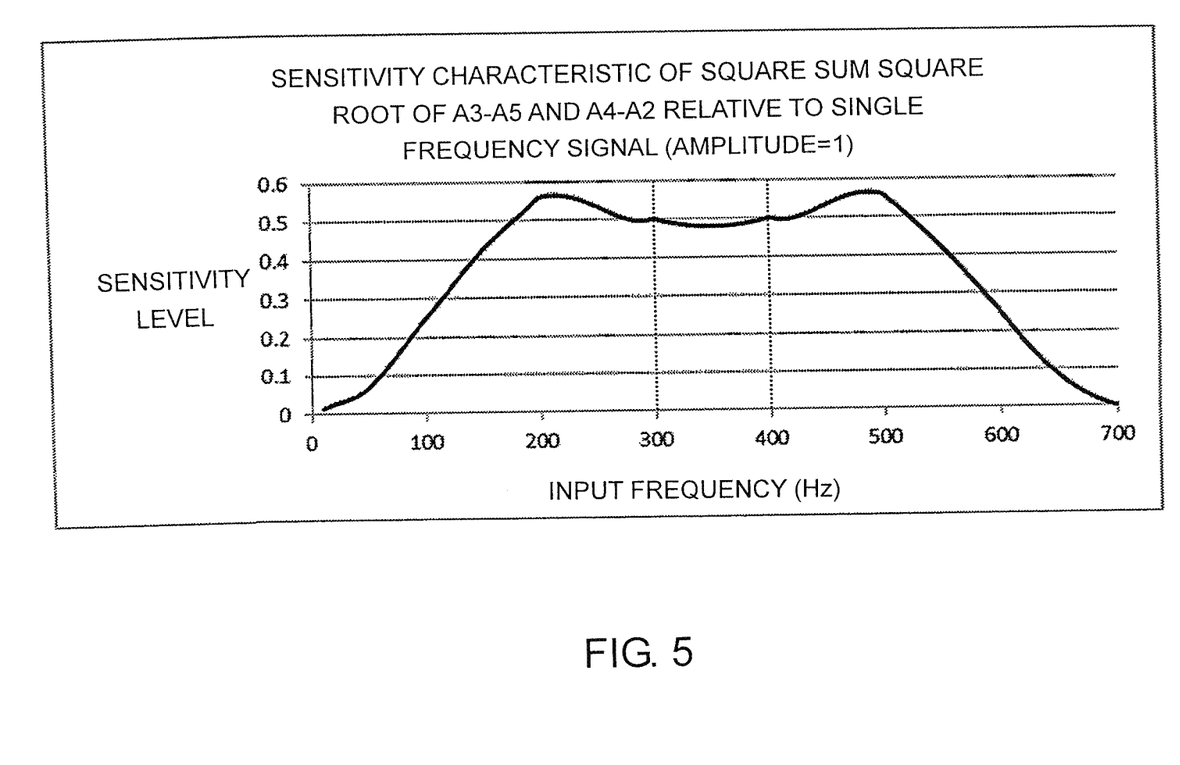
FIG. 5 is a graph showing still another signal characteristic of the circuit shown in the block diagram in FIG. 2.

Also, a graph showing sensitivity characteristic of SRSS of A3−A5 and A4−A2 when the input signal Vd (n) has a single frequency is shown in FIG. 5. As shown in FIG. 5, between 300 Hz (3/(NT)) and 400 Hz (4/(NT)), the sensitivity characteristic indicates, despite the presence of some errors, a value equal to about a half of the amplitude of the input signal. Therefore, it can be understood that the numeric value Ai constitutes a value identified as the amplitude of the input signal.

The numeric value Ai, resulting from identification of the amplitude of the input signal between 300 Hz and 400 Hz by the frequency identifying device 1, is inputted into a comparator 2, and in a case where Ai is larger than a predetermined numeric value AT, a frequency setting signal Set that is set to 1 is outputted to a digital notch filter 3. With the frequency setting signal Set set to 1, the digital notch filter 3 changes the center frequency of the notch filter to the numeric value Fi, or the identified value of the frequency of the input signal outputted by the frequency identifying device 1. Also, the digital notch filter 3 removes a component of the frequency from the torque instruction value Tc, and outputs a torque instruction value Tn, or a result of removal. In accordance with the torque instruction value Tn, a current converter 5 applies current control to the three-phase wiring current UVW of a servo motor 6.

The example in FIG. 1 shows a servo system that is based on an assumption that a machine element of which resonance frequency varies between 300 Hz and 400 Hz is provided on a machine that is driven by a motor. In a case where a large signal component is generated with the speed deviation Vd due to resonance between 300 Hz and 400 Hz, use of a frequency identifying device and a signal removal apparatus according to the present invention with such a machine makes it possible to identify the resonance frequency, and make the removal frequency of the notch filter coincide with the resonance frequency in such a short response time as 10 ms. Thus, even though the resonance frequency should change significantly at the time of activation of the machine as a heavy workpiece etc. is mounted on a table, it is possible to promptly reduce the resonance. With the above, it is possible to prevent temporary generation of abnormal noise due to resonance immediately after activation. Also, as it is possible to identify a frequency with high accuracy, the Q value of the notch filter can be readily set high. Therefore, it is possible to reduce deterioration in low band phase characteristic due to a notch filter.

Regarding the speed deviation signal Vd, as the speed instruction signal Vc the speed signal Vel is held, on principle, only a very small speed deviation signal Vd will be contained. Also, normally as the main component contained in the speed deviation signal Vd is dominantly a low band component necessary for control, there is substantially no high band signal when there is no resonance, etc. However, in a case where a large number of resonance frequencies are present in a high band, there is a possibility that the frequency identifying device 1 will respond to a plurality of signals. To address the above, a higher resonance frequency component is removed by a filter of the transfer function calculator 10 for servo control. Then, a lower resonance frequency, which is likely to change and possibly affect a low band phase characteristic, may be removed by the frequency identifying device 1 and the notch filter 3.

Figure 6:
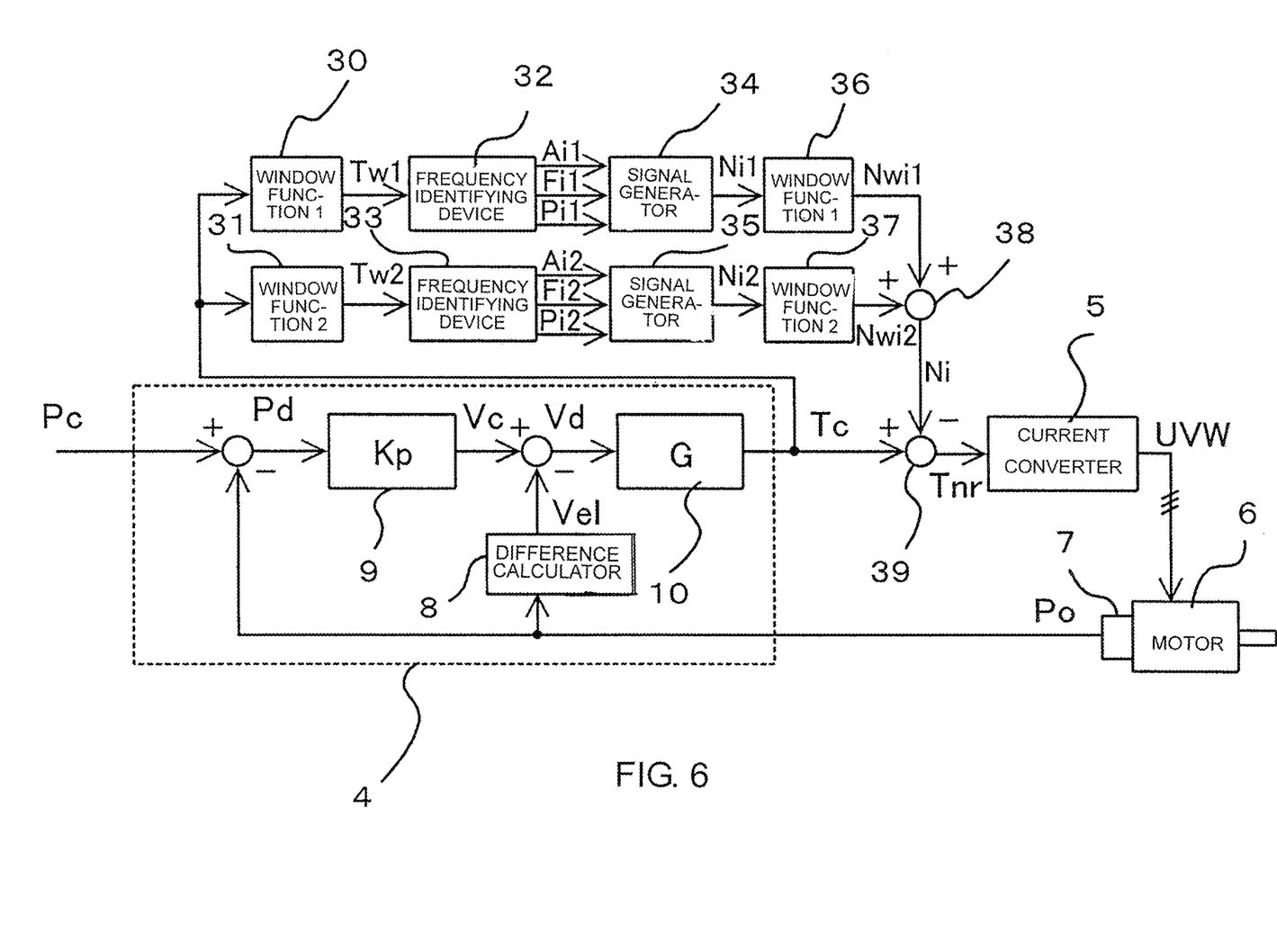
FIG. 6 is block diagram of a servo control system, showing one example of a signal removal apparatus including a frequency identifying device according to another embodiment of the present invention and a signal generator combined.

FIG. 6 is a block diagram of a servo control system, showing one example of a signal removal apparatus made by combining a frequency identifying device according to another embodiment of the present invention and a signal generation device. Note that elements in FIG. 6 that are similar to those in FIG. 1 are given the same reference numerals, and are not described again here.

In FIG. 6, the torque instruction value Tc outputted from the transfer function calculator 10 is inputted to respective window function calculators 30, 31. The window function calculator 30 executes a calculation of a Hann window function of Vd(n)*(0.5−0.5*COS($2\pi*n/N$)) for the Vd(n) inputted, and outputs the result of calculation as a numeric value Tw1 to a frequency identifying device 32. Also, a window function calculator 31 executes a calculation of a Hann window function of Vd(n)*(0.5−0.5*COS($2\pi*n/N+\pi$)) for the Vd (n) inputted, and outputs the result of calculation as a numeric value Tw2 to a frequency identifying device 33.

Figure 7:
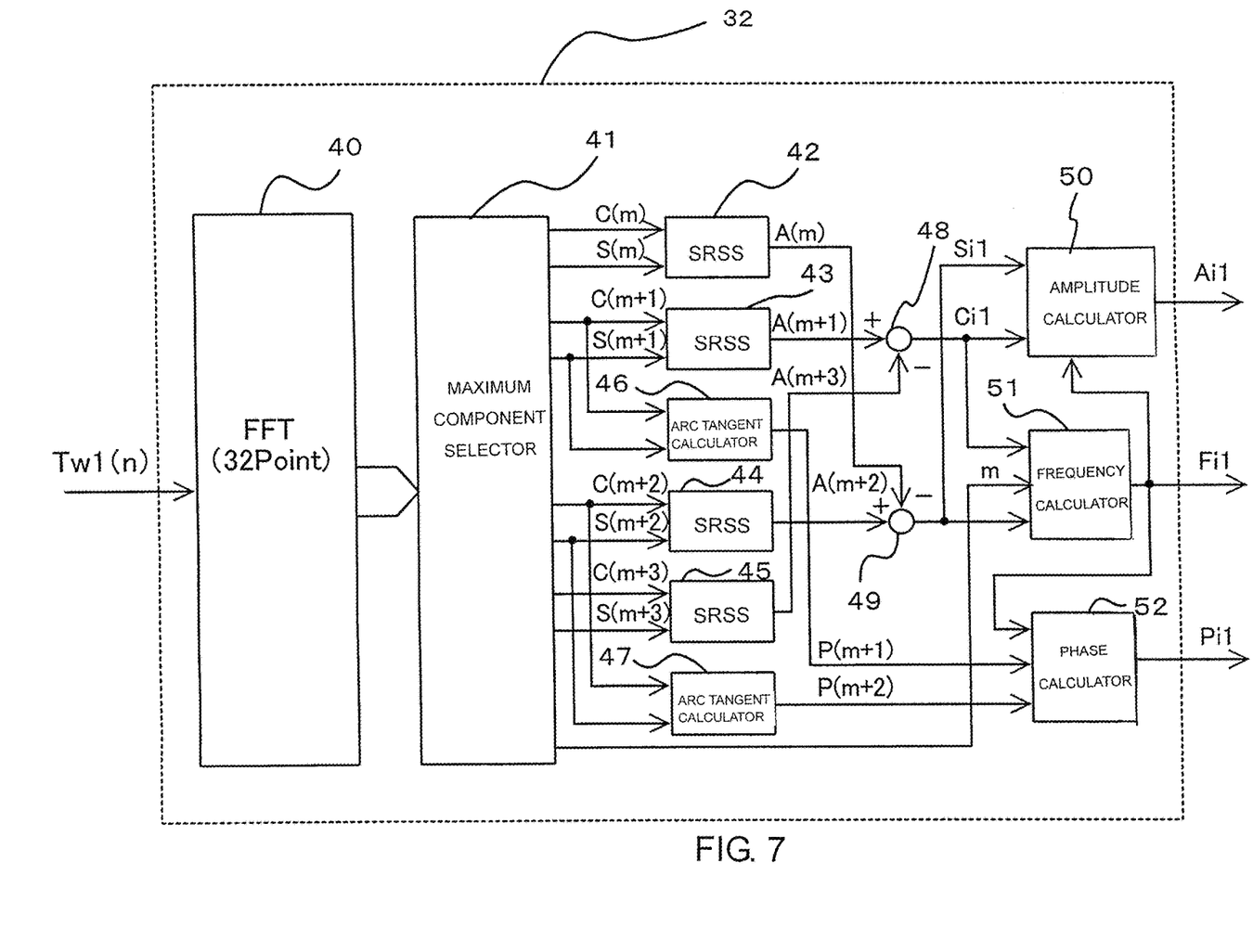
FIG. 7 is a block diagram showing an internal structure of the frequency identifying device shown in FIG. 6.

An example of an internal structure of the frequency identifying device 32 is shown in FIG. 7. Note that the internal structure of the frequency identifying device 33 also has a similar internal structure. The frequency identifying device 32 has an FFT operation device 40, and the FFT operation device 40 executes fast Fourier calculation on the values of thirty-two respective numeric values Tw1(n) for every thirty-two numeric values, outputted from the window function calculator 30, beginning with one with a window function of zero. With the above, the FFT operation device 40 calculates COS components up to a fifteenth order, namely C1, C2, C3, C4, C5, C6, C7, C8, C9, C10, C11, C12, C13, C14, C15, and SIN components up to a fifteenth order, namely, S1, S2, S3, S4, S5, S6, S7, S8, S9, S10, S11, S12, S13, S14, S15, with 62.5 Hz (corresponding to 1/(32T)) as a first order basic wave, and outputs the calculated values. In a maximum component selector 41, components of two adjacent orders at the maximum levels are selected from among the calculated components of orders equal to or greater than the second order and equal to and less than the fourteen-order. That is, among the respective components of orders from the second to fourteenth orders, components of two adjacent orders of which amplitudes (that is, a square root of sum of squares of a SIN component and a COS component) are the first (maximum) and the second are specified (in general, orders with the largest amplitude and the second largest amplitude are adjacent to each other). Then, assuming that a smaller order of the two orders specified is denoted as an (m+1) order, numeric values Cm, Sm, C(m+1), S(m+1), C(m+2), S(m+2), C(m+3), S(m+3) and a numeric value m are outputted. The numeric values Cm and Sm, the numeric values C(m+1) and S(m+1), the numeric values C(m+2) and S(m+2), and the numeric values C(m+3) and value S(m+3) are inputted into respective SRSS calculators 42, 43, 44, 45. The SRSS calculators 42, 43, 44, 45 respectively calculate square roots of the sum of the squares of the two respective numeric values inputted, and output the results of calculation as numeric values Am, A(m+1), A(m+2), and A(m+3).

A subtractor 48 executes a calculation of A(m+1)−A(m+3), and outputs the result of calculation as a numeric value Ci1. Also, a subtractor 49 executes a calculation of A(m+2)−Am, and outputs the result of calculation as a numeric value Si1. For the numeric values Ci1, Si1, and m, a frequency calculator 51 executes a calculation of (m+1+2*A TAN 2(Ci1, Si1)/π)/(NT) to thereby obtain a numeric value Fi1, and outputs the obtained value. Also, for the numeric values Ci1 and Si1, an amplitude calculator 50 executes a SRSS calculation of SQRT(Ci^2+Si^2). Further, the amplitude calculator 50 obtains from a conversion table a conversion coefficient corresponding to the value of the numeric value Fi1 obtained by the frequency calculator 51, finely adjusts the result of the above described SRSS calculation, using the conversion coefficient, then doubles the result of fine adjustment, and outputs the resultant value as a numeric value Ai1. Note that conversion coefficients in the conversion table for use in fine adjustment using the value of the numeric value Fi1 are the same as conversion coefficients for converting the sensitivity level between 300 Hz ((m+1)/(NT)) and 400 Hz ((m+2)/(NT)) in the graph in FIG. 5 into a constant value, namely 0.5.

Also, an arc tangent calculator 46 executes two-term arctangent calculation A TAN 2 for the numeric values C(m+1) and S(m+1), and outputs a numeric value P(m+1) as a result of calculation. Similarly, an arc tangent calculator 47 executes two-term arctangent calculation for the numeric values C(m+2) and S(m+2), and outputs a numeric value P(m+2) as a result of calculation. A phase calculator 52 receives inputs of the numeric value P(m+1), the numeric value P(m+2), and the numeric value Fi1, then removes the amount of offset (which can be obtained from FIG. 8 to be described later) of the phase of P(m+1) or P(m+2) with the phase of the input signal (a specific example to be described later) being zero from either the numeric value P(m+1) or P(m+2), depending on the value of the numeric value Fi1, and outputs the value of the result of removal with the sign thereof changed as a numeric value Pi1. Note here that in the phase calculator 52, when the numeric value Fi1 is closer to (m+1)/(NT) than to (m+2)/(NT), the numeric value Pi1 is calculated based on the numeric value P(m+1), and when the numeric value Fi1 is closer to (m+2)/(NT) than to (m+1)/(NT), the numeric value Pi1 is calculated based on the numeric value P(m+2). That is, the order of one of (m+1)/(NT) and (m+2)/(NT) to which the numeric value Fi1 is closer is used in calculation of Pi1, as described above, because higher accuracy can be expected. However, Pi1 can be calculated based on any one of (m+1) and P(m+2) when slight deterioration of accuracy is tolerated. Further note that the above described "removal" calculation is made between the same orders. That is, for example, when it is determined to calculate the numeric value Pi1, based on the numeric value P(m+1), the amount of phase offset (which can be calculated from relationships shown in FIG. 8) of P(m+1) with the phase of the input signal being zero is removed, that is, subtracted, from the numeric value P(m+1) outputted by the arc tangent calculator 46, and a value obtained by reversing the sign of the value of the result of subtraction is calculated as the numeric value Pi1.

Figure 8:
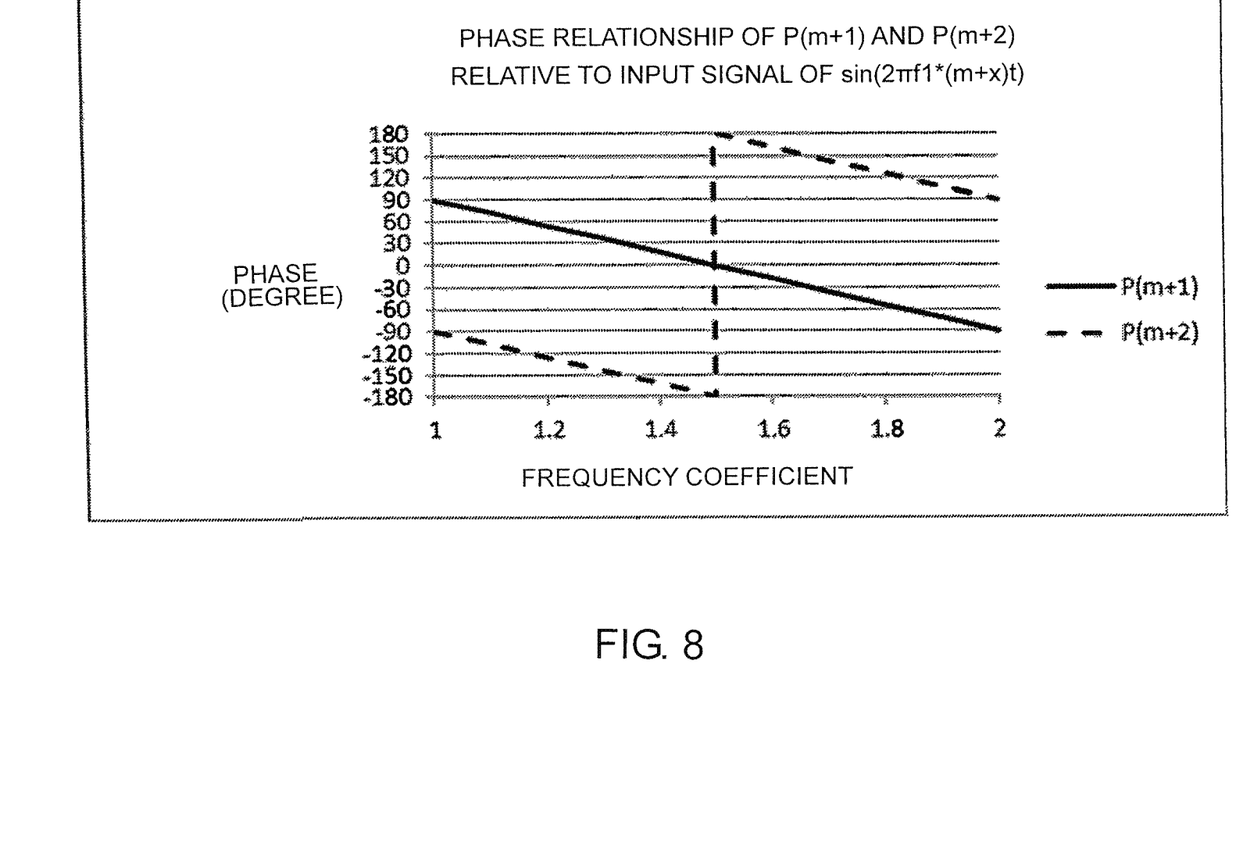
FIG. 8 is a graph explaining operation principle of a phase calculator in the circuit shown in FIG. 7.
Figure 9:
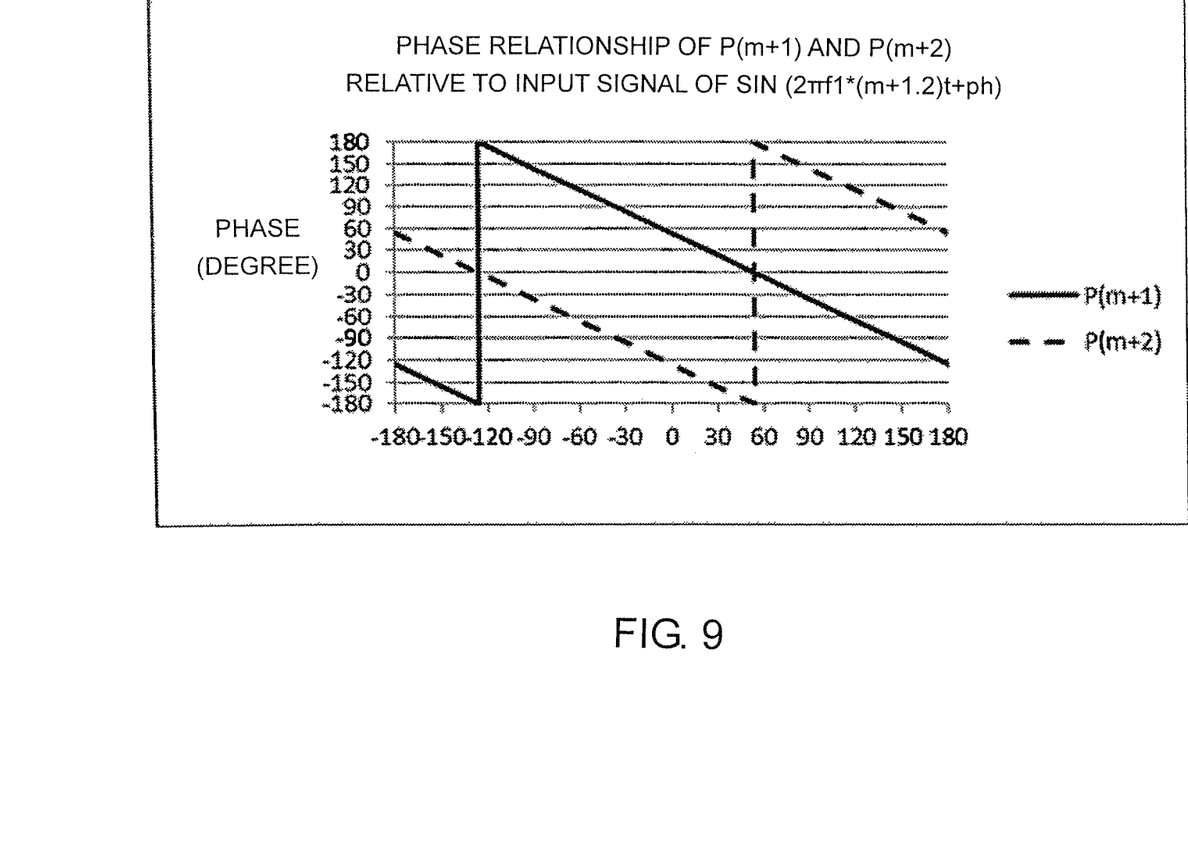
FIG. 9 is a graph explaining operation principle of a phase calculator in the circuit shown in FIG. 7.

When the frequency coefficient x=2*A TAN 2(Ci, Si)/π is held, a graph showing phase relationships of a numeric value P(m+1) and of a numeric value P(m+2) relative to an input signal sin (2π/NT*(m+1+x) t) with phase 0 is shown in FIG. 8. Also, referring as an example to an input signal with the frequency coefficient x=0.2, a graph showing phase relationships of the numeric value P(m+1) and of the numeric value P(m+2) relative to an input signal with the phase ph changed are shown in FIG. 9. As will be understood from the graph in FIG. 9, the numeric value P(m+1) and the numeric value P(m+2) (generally) decrease linearly as the phase of the input signal increases (though, it cyclically repeats). Also, as will be understood from the graph in FIG. 8, when the phase of the input signal is zero, the phase offset amount of the numeric value P(m+1) and that of the numeric value P(m+2) (the ordinate in FIG. 9) decrease linearly as the frequency coefficient x increases. With the above, it can be understood that the numeric value Pi1 obtained in the above described calculation constitutes an identified value of the phase of the input signal. With the above described processing, in the frequency identifying device 32, it is possible to identify the frequency, phase, and amplitude of a signal of a large component in a high band contained in the torque instruction value Tc, that is, an input signal.

The frequency Fi1, the phase Pi1, and the amplitude Ai1 all identified by the frequency identifying device 32 are inputted into a signal generator 34, and the signal generator 34 outputs a numeric value Ni1 as a signal that is determined based on the identified parameters. The numeric value Ni1 is inputted into a window function calculator 36. In the window function calculator 36, similar to the window function calculator 30, calculation of a Hann window function of Ni1(n)*(0.5−0.5*COS(2π*n/N)) is executed for the Ni1(n) inputted, and the result is outputted as a numeric value Nwi1.

In a frequency identifying device 33, a signal generator 35, and a window function calculator 37, processing similar to that which is executed in the frequency identifying device 32, the signal generator 34, and the window function calculator 36 is executed for the numeric value Tw2 at a time deviated by 16T from the time when the frequency identifying device 32, the signal generator 34, and the window function calculator 36 execute the processing. With the above, processing similar to that which is executed by the frequency identifying device 32 and the signal generator 34 is also executed for a signal component of the torque instruction value Tc removed by the window function calculator 30. Therefore, a numeric value Nwi2 for compensation of the numeric value Nwi1 is outputted from the window function calculator 37. The numeric values Nwi1 and Nwi2 are combined, or added, in an adder 38, and the result of combination is outputted as a numeric value Ni. In a subtractor 39, the numeric value Ni is subtracted from the torque instruction value Tc, and the result of subtraction is outputted as a numeric value Tnr. The numeric value Tnr is inputted as a torque instruction value into the current converter 5.

With the above, in the frequency identifying device shown in FIG. 7, it is possible to identify an adverse signal component contained in the torque instruction value Tc, generated in a larger area in a high band, compared to the frequency identifying device shown in FIG. 2. Also, it is possible to generate a signal of the identified frequency component in a signal generation device and remove it from the torque instruction value Tc. With the above, it is possible to prevent, without a filter, generation of abnormal sound in a high band due to interpolation error of an encoder. Also, even when a mechanical resonance is suddenly caused in a high band, it is possible to remove such mechanical resonance unless the resonance level largely exceeds a condition for oscillation, and also to prevent generation of abnormal sound due to resonance. However, in a condition in which the mechanical resonance level is high and resonance is readily caused, it is necessary to remove resonance frequency by using a digital notch filter, as in the example in FIG. 1.

Note that although, in the example in FIG. 1, an example including one digital notch filter is shown, two or more digital notch filters may be provided so that when identified frequencies are significantly apart from each other, removal frequency of another notch filter may be set. With this arrangement, it is possible to remove adverse signal components for two or more resonance frequencies.

The invention claimed is:

1. An apparatus for controlling a motor based on an input signal, the apparatus comprising:
   a sampler which samples an N number of input signals in a constant cycle T;
   a window function calculator which multiplies the N number of signals by a window function and outputs an N number of data;
   a frequency identifier which identifies a frequency of the input signal, comprising,
      a Fourier converter which applies Fourier conversion to the N number of data and obtains eight values including COS components and SIN components of m-order (m being a natural number less than N/2−4), m+1 order, m+2 order, and m+3 order, namely, $C(m)$, $C(m+1)$, $C(m+2)$, $C(m+3)$, $S(m)$, $S(m+1)$, $S(m+2)$, and $S(m+3)$, with an NT cycle as a first order,
      a component calculator which obtains values of components of m-order, m+1 order, m+2 order, and m+3 order namely, A2, A3, A4, and A5 from the COS components and SIN components of m-order, m+1 order, m+2 order, and m+3 order;
      a subtractor which calculates values, Si=A4−A2 and Ci=A3−A5 from the values, A2, A3, A4, and A5;
      a frequency calculator which calculates frequency Fi based on the values, Si and Ci and outputs the calculated frequency Fi as an identified frequency Fi;
   a filter which:
      receives the input signal;
      receives the identified frequency Fi;
      removes a component of the identified frequency Fi from the input signal; and
      outputs the resulting value as a torque instruction value for the motor; and
   a current converter which applies a current in accordance with the torque instruction value to a three-phase wiring current of the motor.

2. The apparatus according to claim 1, wherein when a function of a square root is denoted as SQRT,
   the component calculator calculates $A2=SQRT(C(m)^2+S(m)^2)$, $A3=SQRT(C(m+1)^2+S(m+1)^2)$, $A4=SQRT(C(m+2)^2+S(m+2)^2)$, and $A5=SQRT(C(m+3)^2+S(m+3)^2)$.

3. The apparatus according to claim 2, wherein when an arc tangent function of two variables is denoted as A TAN 2, the frequency calculator calculates Fi=(m+1+2*A TAN 2(Ci, Si)/π)/(NT) to thereby identify the frequency Fi.

4. The apparatus according to claim 1, further comprising an amplitude identifier which identifies an amplitude of a signal of a frequency Fi, based on a value of 2*SQRT(Ci^2+Si^2).

5. The apparatus according to claim 4, wherein the frequency identifier identifies a phase of a signal of a frequency Fi, based on the frequency Fi and a value of A TAN 2(C(m+1), S(m+1)) or a value of A TAN 2(C(m+2), S(m+2)).

6. The apparatus according to claim 5, wherein the frequency identifier comprising:
   a digital signal generator which generates a target signal having the identified frequency Fi, the identified amplitude and the identified phase, and
   a subtractor which subtracts the target signal from the input signal.

7. The apparatus according to claim 1, wherein the frequency calculator calculates a phase of a signal of a frequency Fi, based on the frequency Fi and a value of A TAN 2(C(m+1), S(m+1)) or a value of A TAN 2(C(m+2), S(m+2)).

8. A method for controlling a motor based on an input signal, comprising:
   sampling an N number of input signals in a constant cycle T;
   multiplying the N number of signals by a window function and outputting an N number of data;
   applying Fourier conversion to the N number of data and obtaining eight values including COS components and SIN components of m-order (m being a natural number less than N/2−4), m+1 order, m+2 order, and m+3 order, namely, $C(m)$, $C(m+1)$, $C(m+2)$, $C(m+3)$, $S(m)$, $S(m+1)$, $S(m+2)$, and $S(m+3)$, with an NT cycle as a first order,
   obtaining values of components of m-order, m+1 order, m+2 order, and m+3 order namely, A2, A3, A4, and A5 from the COS components and SIN components of m-order, m+1 order, m+2 order, and m+3 order;
   calculating values, Si=A4−A2 and Ci=A3−A5 from the values, A2, A3, A4, and A5;
   calculating frequency Fi based on the values, Si and Ci and outputting the calculated frequency Fi as an identified frequency Fi;

removing a component of the identified frequency Fi from the input signal;
outputting the resulting value as a torque instruction value for the motor; and
applying a current in accordance with the torque instruction value to a three-phase wiring current of the motor.

* * * * *